Jan. 9, 1962 H. Z. GORA 3,015,843
APPARATUS FOR MAKING COMPOSITE ARTICLES
Filed Feb. 1, 1956 4 Sheets-Sheet 1
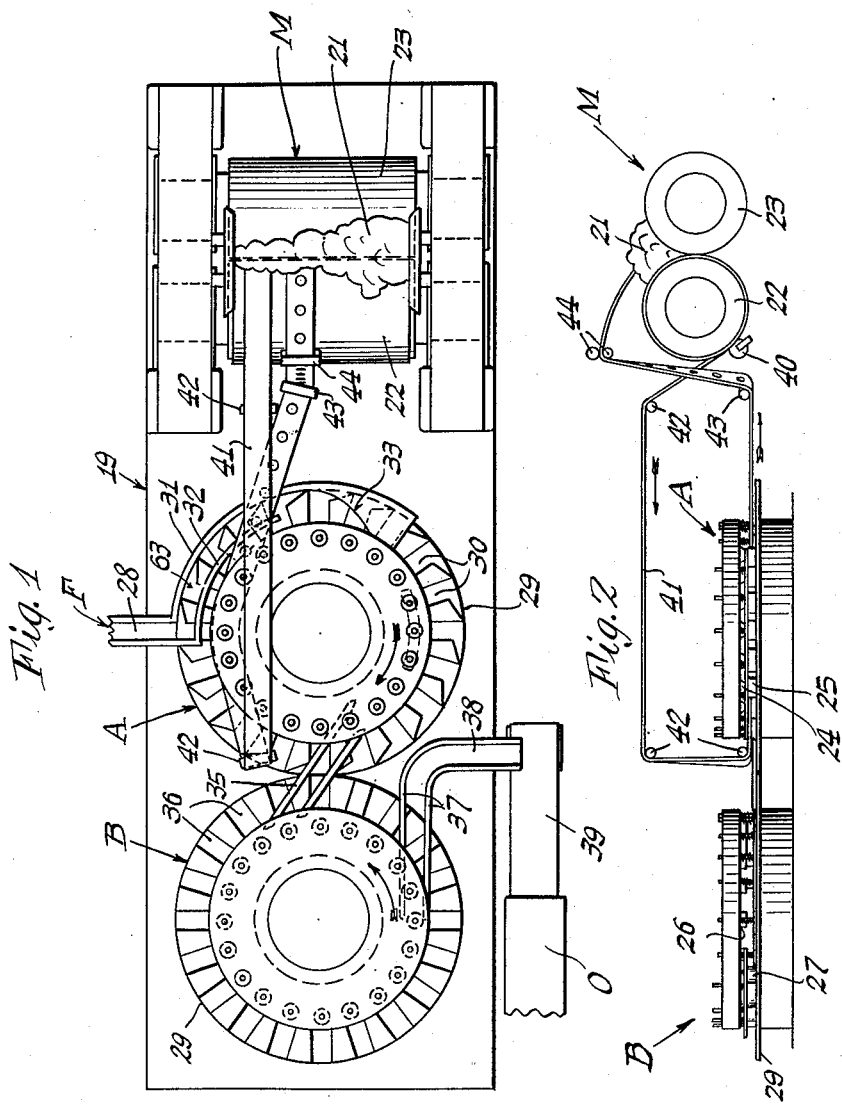
INVENTOR.
Henry Z. Gora
BY
Johnson and Kline
ATTORNEYS

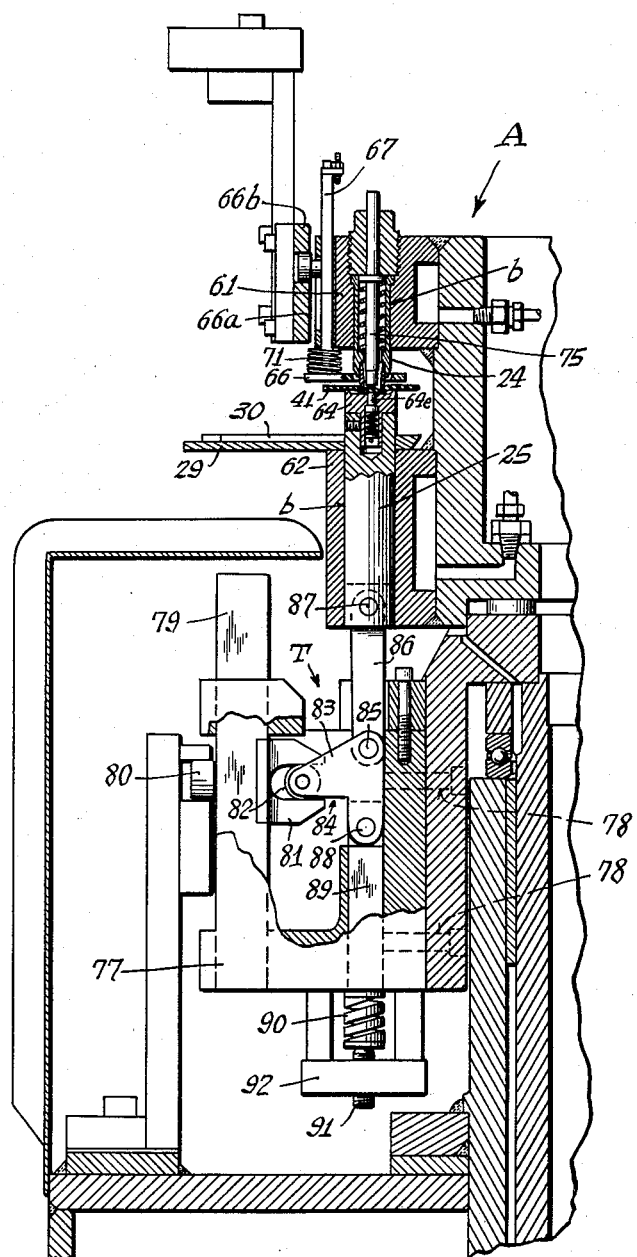

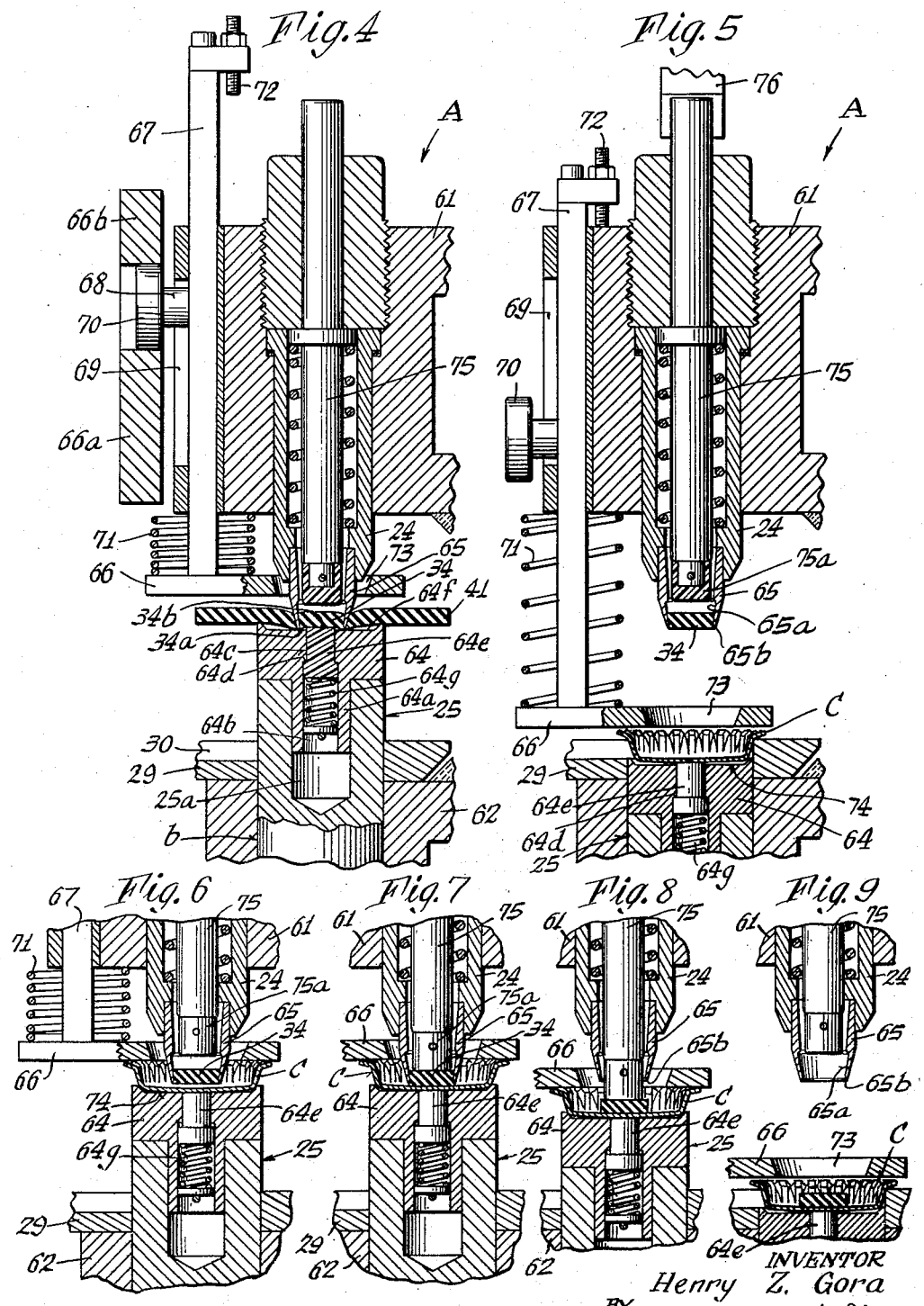

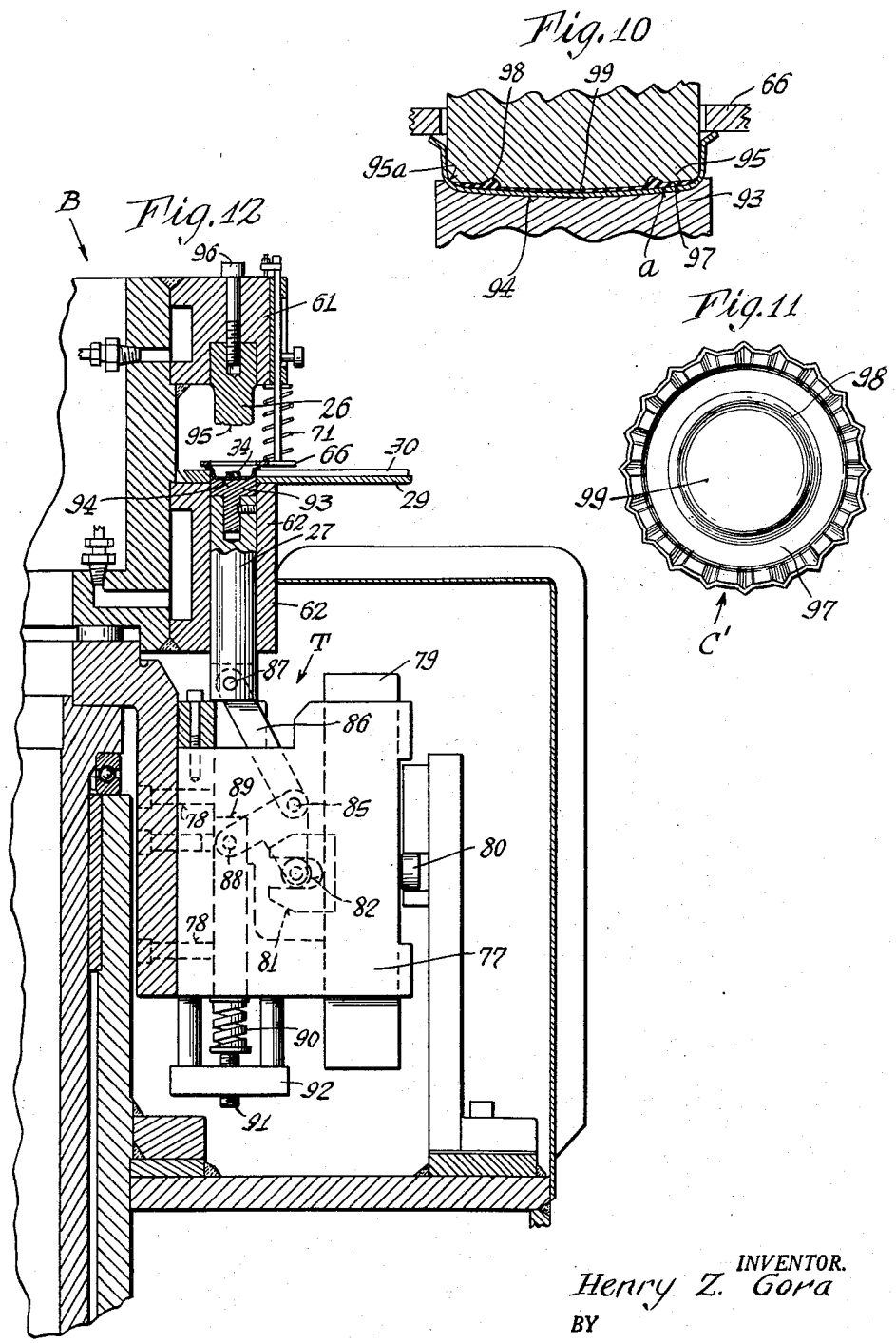

United States Patent Office 3,015,843
Patented Jan. 9, 1962

3,015,843
APPARATUS FOR MAKING COMPOSITE ARTICLES
Henry Z. Gora, Stratford, Conn., assignor, by mesne assignments, to Anchor Hocking Glass Corporation, Lancaster, Pa., a corporation of Delaware
Filed Feb. 1, 1956, Ser. No. 562,904
6 Claims. (Cl. 18—5)

This invention relates to means for producing composite articles, e.g. closures, washers, gaskets, diaphragms and the like, including a base member and a molded member of determinate volume, size and shape, and position on the base member, which molded element is adhesively attached or bonded to said base member. More particularly, this invention relates to the making of a container closure having a flange and a resilient gasket of elastomeric material molded therein within the flange.

To produce a composite article, for example a flanged closure and liner therefor, there are employed cooperating blanking die members and cooperating molding die members relatively movable to open and closed positions. The blanking die members consist of a hollow die head having a peripheral cutting edge cooperating with an anvil to blank a slug from a strip of adhesive, elastic, moldable material positioned therebetween. The slug is retained in the hollow die member for subsequent transferal to a base member, for instance a flanged closure or cap. An ejector slidably mounted in the hollow die head forces the slug outwardly therefrom to position the same on a base member which has been placed on the anvil in spaced relation to the blanking die, so that the ejector presses the slug into adhesive engagement with the base member.

After the slug of moldable material is transferred to the base member, a molding die is brought against the slug-carrying base member under pressure to mold the moldable member to size and shape in situ on the base member. As this occurs, the moldable material flows laterally to fill the cavity formed by the base member and the molding die, as the cut-off surface of the latter finally closes on the base member.

Because of the adhesive character of the moldable material from which the slug is blanked, it frequently happens that the slug becomes adhered to the anvil member during the blanking operation, therefore preventing the slug from being retained by the hollow blanking die head. When this occurs, the presence of the slug on the anvil would prevent the positioning of the base member on the anvil and, of course, the slug could not be transferred onto the base member, and the molding operation could not be completed. This difficulty is particularly aggravated where the operations include a continuous succession of blanking and molding dies operating at high speed seriatim on a succession of base members.

An important feature of this invention is the provision of means for insuring a positive pick-up of the blanked slug of the moldable material by the hollow blanking die.

Also, it sometimes occurs that a slug will adhere more tenaciously to the ejector than to the base material as the ejectors press the slug onto the base member, thereby rendering the transferal incomplete even though the slug has been properly retained by the blanking die.

Another important feature resides in the provision of methods and means for insuring positive adhesion of the slug in predetermined position on the base member upon completion of the controlled transferal of the slug from the die head to the base member.

Where the slug is formed by the blanking die and is then transferred by the ejector plunger to the base member, there is further presented the danger of the shifting of the slug relative to the ejector as it leaves the blanking die and travels across the space to the base member.

This results in the slug not being properly positioned on the base member and, therefore, the lateral flow of the material of the slug may be excessive in one direction or another depending upon its position on the base member, and as a result some of the molding material may be located beyond the cut-off surface of the molding die member. This inherent difficulty is particularly aggravated with the increase of the distance over which the slug must be transferred from the blanking die to the base member, for instance when the base member includes an upstanding flange as in the case of a flange bottle cap.

Another contributing factor to this difficulty is that the vibration or other movement of the die and/or base member incidental to the operation of high speed molding equipment may cause the slug to shift relative to the ejector as it advances to the base member.

Another feature of this invention is the provision of means for insuring positive control of the slug as it is transferred from the blanking die to the base member so that the slug will be properly positioned thereon to insure the complete and proper filling out of the cavity of the molding dies in the succeeding molding operation.

According to this invention, the above advantages are obtained by causing the slug to be positively retained by the blanking die upon the blanking thereof and thereafter positively controlling the positioning and transferal of the slug from the blanking die to the base member whereby the slug is positively adhered in proper position on the base member so that a subsequent in situ molding operation can be properly performed. The transferal is controlled, in the form of this invention herein disclosed, by positively adhering the slug to the base member before the slug is completely ejected from the blanking die.

In the form of the invention illustrated, the pick-up, transferal and positioning of the slug on the base member are accomplished by providing a movable anvil die head having a resiliently mounted plunger member formed of a non-adhering material, a portion of the plunger being raised above the surface of the anvil die to project within the hollow portion of the blanking or cutting die head when the said dies are closed. In this manner, when the blanking dies are closed, a slug is blanked so that only the peripheral portions thereof contact the surface of the anvil, the major portion of the slug being in non-adhering engagement with the non-adhering plunger. Thus, the slug is prevented from adhering to the anvil die head because the peripheral portion of the slug contacting the anvil die is insufficient to form an adhesive bond therewith as the dies are opened. Further, the blanking die head cooperating with the novel anvil die member is provided with tapering or undercut inner peripheral wall portions to insure pick-up and retention of the slugs as the dies are parted.

To positively control the transfer of the slug to the base member and to insure positive adhesion of the slug thereto, the hollow blanking die member is provided with an ejector having a non-metallic cap on the tip thereof for engaging the slug to force the latter outwardly therefrom. The ejector and blanking die are operatively associated so that the slug is pressed onto the base member before the slug is completely released from the blanking die. In this manner, the slug is pressed by the ejector to adhere to the base while the slug is partially retained by the blanking die thereby preventing any lateral shifting thereof. Since the non-metallic tip of the ejector resists adhesion of the slug thereto, positive bond is assured between the slug and base member since the cohesive force between the slug and the base is greater than that cohesive force between the tip of the ejector and the slug. Thus, the slug remains adhered to the base as the latter is moved away from the blanking die, the ejector cooperating therewith to release the slug completely from the blanking die.

The present invention is particularly advantageous in connection with the continuous manufacture of composite bottle caps and other composite articles by methods and apparatus such as disclosed in my copending application Serial Number 386,453 filed October 16, 1953, now Patent 2,952,035 issued on September 13, 1960, where the blanking and molding dies are arranged in a rotating annular series, and the dies reciprocate as well as travel in circular paths at high speeds.

Other features and advantages will hereinafter appear.

In the accompanying drawings:

FIGURE 1 is a diagrammatic plan view showing one form of apparatus to which the present invention may be applied.

FIG. 2 is a similar view looking at the apparatus from the side.

FIG. 3 is a view partly in section and partly in elevation showing the blanking drum, the blanking dies, and toggle mechanism for operating the same, the parts being shown in the positions which they occupy when the dies are closed.

FIG. 4 is a similar view showing the cooperating dies on an enlarged scale.

FIG. 5 is a view similar to FIG. 4, but showing the blanking die with the slug therein and with the cap in position thereunder ready to receive the slug from the blanking die.

FIG. 6 is a fragmentary view of the parts shown in FIG. 5 wherein the cap or base member is positioned to receive the slug.

FIG. 7 is a fragmentary view as shown in FIG. 6 wherein the ejector has partially ejected the slug from the die to adhesively secure the same to the cap, the slug being partially retained by the die to insure positive positioning of the same on the cap.

FIG. 8 is a fragmentary view of the parts shown in FIG. 7 wherein the ejector forces the slug completely free of the die as the cap member moves away therefrom.

FIG. 9 illustrates the parts wherein the ejector is in retracted position and the slug-carrying cap is ready for the subsequent molding operation.

FIG. 10 is a detail view of the molding dies showing the latter in closed molding position.

FIG. 11 is a detail view of a closure member in the form of a crown cap having the molded liner adhered thereto.

FIG. 12 is a view similar to FIG. 3 but showing the molding dies with a slug-carrying cap in position to be moved against the molding die.

As stated above, the present invention is particularly advantageous when used in connection with high speed apparatus for continuously making composite articles including an elastomeric member, such as molding a resilient liner in situ on a bottle cap. Such apparatus is disclosed in my copending application Serial No. 386,453, filed October 16, 1953, now Patent 2,952,053 which comprises, as illustrated in FIGS. 1 and 2, in addition to a suitable frame or supporting structure 19, a warming mill M having mill rollers 22 and 23, a blanking drum A carrying a circular series of axially aligned blanking die members 24 and 25 which may be opened and closed automatically as the drum rotates, and a drum B carrying a circular series of axially aligned molding die members 26 and 27 which also are opened and closed automatically as the drum rotates. The apparatus also includes a cap feed device F including a chute 28 from which the caps C are deposited one at a time, inner side up, on a plate 29 in radial grooves 30 on the drum A with which the caps travel under the control of guides 31 and 32 until they are moved by a cam 33 into the space between the open cooperating die members 24 and 25 to receive a slug 34 of material from which the gasket is to be molded. The slug-carrying caps C continue traveling with the drum A until they are engaged by a cam 35 which causes them to move radially outwardly along the grooves 30 and be transferred to grooves 36 in the plate 29 of the drum B and between the cooperating die members 26 and 27 which are brought together and held under pressure to mold the slug and form the gasket thereon, as the drum B rotates. When caps C' with the molded gaskets reach the discharge station they are engaged by a cam 37 which moves them outwardly along their grooves 36 onto a chute 38 from which they may be collected for further treatment under temperature controlled conditions if required. When the gasket material is of a type requiring vulcanization, the caps C' may drop from the chute 38 onto a conveyer 39 and on the latter pass through a curing oven O.

From a bank of material 21 between the mill rollers 22 and 23, a layer of moldable gasket material is built on the roller 22 and from this layer there is cut by knives 40 a continuous strip 41 of warmed gasket material which is slightly wider than necessary to form the slug 34 and of the desired thickness. The strip 41 is guided away from the mill horizontally, over guide rollers 42, then downwardly, and then in a reverse direction horizontally so that it enters in the space between cooperating blanking die members 24 and 25 which close upon the strip and remove therefrom the slug 34 having an amount of molding material sufficient to form the gasket. The strip 41 follows the path of the die members 24 and 25 because several members 24—25 are in simultaneous engagement with it and cause it to travel with the dies and drum A for a short distance. As will be explained in more detail below, when the die members 24 and 25 open, the slug 34 is retained by the die member 24 and the strip is allowed to pass from between the die members and be guided by a roller 43 and feed rollers 44 back to the mill M to commingle with the bank 21 thereon and be reused to form the strip. After the strip is removed from between the die members 24 and 25, the naked caps which are carried by the plate 29 are moved successively as they pass a given point into the space between the die members 24 and 25 by the cam 33 and the slug 34 is then transferred from the die member 24 to the inner surface of the cap C. The slug adheres to the cap due to the tackiness of the material and remains so attached while the cap is transferred to the molding die members 26 and 27.

Preferably the mill operates continuously and the drums A and B continuously rotate, thus producing a continuous succession of caps on the underside of each of which is molded a gasket, the parts being driven by an electric or other type of motor.

The blanking drum A and the molding drum B are for the most part alike. Each has an upper flange 61 and a lower flange 62 secured to it, and these flanges have aligned bores *b* arcuately spaced around them (see FIGS. 1 and 12). The lower flanges 62 carry the cap-guiding tables 29 which, as stated above, have cap-guiding grooves 30. The cap-guiding grooves 30 on the drum A have enlarged entrance portions 63 so that the caps can enter the grooves 30 from the relatively stationary chute 28 while the drum A is rotating.

In the form of the invention herein disclosed, the die members 25 and 27, as shown in FIGS. 4 and 10, are movably mounted in the flanges 62, while the die members 24 and 26 are held in flanges 61 against axial movement. Each die member 25 is in the form of a reciprocating member having mounted on its upper end an anvil head 64, and each die member 24 carries a hollow blanking or cutting head 65 located above the anvil head 64. Thus, when the latter is raised as the strip 41 of moldable material is above it, the anvil head 64 will carry the strip against the blanking head 65 to blank a slug 34. When the die member 25 descends, the slug 34 is retained in the hollow blanking head 65 as shown in FIG. 5, and this slug is, as explained above, subsequently transferred to the cap C.

In order to prevent any possibility of the slug from adhering to the anvil head 64 as the die members 24 and 25 are parted or opened, means are provided to render the slug non-adhesive to the anvil head. As shown, the anvil head 64 is provided with a depending sleeve 64a which is received in a bore 25a of the die member 25 to connect the same thereo. The sleeve 64a is provided with a bore 64b having a reduced portion 64c forming a shoulder 64d. Positioned in the bore 64b there is provided a plunger 64e which normally projects slightly above the upper surface 64f of the anvil head. While the plunger may be made of any non-metallic or other material which resists adhesion of the slug thereto, Teflon has been found to be very satisfactory; Teflon having a wax-like smoothness which is suitable for preventing the slug from adhering thereto.

The Teflon plunger 64e is resiliently supported in the bore 64b by a spring 64g which normally urges the plunger to project slightly above the upper surface 64f of the anvil head. Shoulders on the plunger engaging the shoulders 64d form a stop therefor. Thus, it will be noted in FIG. 4, that as the dies 24 and 25 are closed and the slug is blanked, only the peripheral portion 34a of the slug is in contact with the anvil head; the plunger 64e maintaining the central portion 34b of the slug spaced from the upper surface 64f of the anvil head. In order to blank the slug as above described, it is necessary that the spring 64g be sufficiently strong to resist normal closing pressure of the blanking dies. However, in the event that an abnormally thick slug is blanked or if for some other reason the normal blanking pressure becomes excessive, the latter overcomes the force of the plunger spring 64g to prevent ramming of the dies.

According to this invention, the blanking die head 65 is provided with a taper or under-cut 65a on the inner walls thereof. As a result, the slug is blanked with the side thereof slightly tapered, thus the retention of the slug in the blanking head 65 is rendered more positive as the dies 24 and 25 are opened. As shown in FIG. 5, the slug is positively picked up and retained therein even though the apparatus described operates at relatively high speeds.

Associated with each of the die members 24 and 26 is a presser plate 66 mounted on a rod 67 slidably mounted on the upper flange of the drum. The rod 67 has a pin 68 connected therewith, extending through a slot 69 and having at its end a roller 70. The presser plate is provided with a spring 71 which urges it downwardly to a position controlled by an adjustment screw 72. Before the blanking die 64 rises, its associated presser plate has been raised by engagement with a cam 66a to a position above the end of the blanking die 65, the presser plate 66 having an aperture 73 through which the blanking die extends. When the die member 25 descends to free the strip 41, the presser plate 66 operated by a cam 66b pushes the strip 41 off the die 65 to release the strip therefrom. The spring 71 may be made sufficiently strong to cause this downward movement of the presser plate but, for more positive action, the operation is preferably performed by the cam 66b which engages the roller 70.

The die head 64 is provided with a cavity 74 at its upper end which slidably receives and fits the cap when the cap is slid by the cam 33 along the groove 30, the top of the die head 64 being substantially flush with the upper surface of the table 29 in its depressed position at the time that the cap is moved onto and nested in the die head.

The die member 24 has a spring-returned ejector pin 75 which projects above the flange 61 and is operated by a cam 76, FIG. 5, at the proper time and location to force the slug 34 from the hollow blanking head 65. This occurs in a manner to be hereindescribed and at a time when the naked cap is raised by the die 64 to bring it into position to receive the slug, as shown in FIG. 6.

The die members 25 and 27 are each moved to die-opening and closing positions by a toggle mechanism T illustrated in FIGS. 3 and 12. There is one such toggle mechanism for each of the movable die members and they are secured to their respective drums so as to project radially therefrom. As shown in FIGS. 3 and 12, the toggle mechanism comprises a frame 77 secured to the drum by screws 78. Guided within the frame there is a slide bar 79 carrying a roller 80 which is engaged by various cams controlling the movements of the die members. Secured to the slide bar is an operating fork 81 which engages a roller 82 on an arm 83 of a toggle link 84 and forming with the latter a bell crank. The link 84 has a pivot pin 85 connecting it with one end of a companion toggle link 86 whose other end is connected by a wrist pin 87 to the die member 25. The other end of the toggle link 84 is connected by a pin 88 to an abutment bar 89 mounted in the frame 77.

When the dies are fully opened, the members 25 and 27 are in the position exemplified by FIG. 12 in which the toggle is collapsed, the pin 85 being out of line with the pins 87 and 88. When, however, the dies are to be closed, the fork 81 moves the bell crank, of which the toggle link 84 is a part, upwardly causing the toggle links 84 and 86 to be extended, and this results in moving the die members upwardly to perform their operations. The cams operating the slide bars 79 may be so arranged as to bring the pivot pins 85, 87 and 88 into line and slightly beyond, as shown in FIG. 3, and thus lock the toggle against closing until the bell crank is moved in the opposite direction to unlock the toggle. Thus, in the case of the molding die members 27, once the toggles are locked with a slug-carrying cap between the dies there is no need of continuing the engagement between the roller 80 and the cam until such time as the dies are to be opened, and the friction and work which would otherwise be involved in keeping the dies closed under pressure is avoided.

To obtain controllable pressure and follow-up pressure the material between the die members, which are important considerations particularly in the operation of molding a gasket on the cap, the abutment 89 carrying the pivot pin 88 is slidably mounted in the toggle frame 77 and has its end in engagement with a spring 90, the other end of which is engaged by a screw 91 carried by a bracket 92 suspended from the toggle frame 77. Should the upward movement of the die member 25 or 27 meet with abnormal resistance, the abutment bar 89 may yield and compress the spring 90. When the resistance ceases, the spring 90 will move the abutment 89 upwardly and this will carry toggle links 84 and 86 and the connected die member upwardly against the material between it and the relatively stationary member. This upward movement of the toggle links 84 and 86 is not interferred with by the fork 81 because the movements are so slight that they may be compensated for by the slight rocking of the bell crank of which the link 84 is a part. The pressure exerted by the spring 90 may be varied by adjusting the screw 91.

The parts may be so adjusted and arranged that when the die members are brought to their intended closed positions, the abutment 89 normally yields slightly, thereby maintaining the dies closed under pressure determined by the adjustment of the spring 90.

In addition to controlling the pressure between the dies, the abutment 89, because of its yielding action, also prevents damage being done to the parts should a cap become improperly seated on the movable die or should a foreign element inadvertently become lodged between the dies.

Referring to the molding die members 26 and 27 in FIG. 12, the movable member 27 is in the form of a plunger and carries on its end a die 93 having a cavity 94 to slidably receive and nest a slug-carrying cap, while the die member 26 carries a molding die 95 held in place by a screw 96. The end of the die 95 is shaped to form a gasket of desired contour, for instance that shown in FIG. 11, which has an annular ring 97, a sealing ridge 98 and a central diaphragm-like cap-covering portion 99.

When the slug-carrying cap is placed on the die 93, the die member 27 is raised by a suitable cam to lock the toggle T and hold the cap and gasket material under pressure. During this movement of the die 93, the presser plate 66, by the action of its spring 71, holds the cap securely in position on the die 93. After the molding operation has been completed, the die 93 descends and the presser plate pushes the gasketed cap C' off the die 95 and returns it to the approximate level of the plate 29 so that the cap C' can be moved radially off the plate 29 by the cam 37.

The slug 34 is of such thickness and diameter as to have a volume substantially equal to the volume of the molded member, the liner in the example given above, so that when the molding die 95 engages it, the moldable material flows laterally on the cap until cut-off surfaces 95a on the molding die engage the cap, at which time the cavity formed between the molding die and the surface of the cap should be filled.

Due to the distance which the slug must travel in being ejected from the blanking die to the cap, there is the possibility of the slug being placed improperly on the base member, that is to say, being placed eccentrically on the cap in the example given, and this condition is aggravated by the fact that the caps and dies are rotating at considerable speed. The result of this misplacing of the slug 34 on the cap would be that the lateral flow of the molding material under the molding die would not be uniform and some of the material would reach beyond the cut-off surfaces 95a of the molding dies before the latter engage the cap.

To avoid this difficulty as pointed out above, means are provided for maintaining control of the slug 34 in its movement from the blanking die to the cap. In the form of the invention herein illustrated, this is accomplished by providing on the end of the ejector plunger 75 a cap or tip member 75a formed of a non-metallic, adhesive resisting material. Preferably, the tip 75a is formed of Teflon, similar to that of plunger 64e.

As shown in FIG. 6, the die member 25 with the naked cap positioned thereon, as hereinbefore described, is brought into slug-receiving position whereby the cap C is spaced from the slug-retaining head 65. In this position the cap C is pressed against the anvil head 64 by the presser plate 66, whereby the plunger 64e is depressed to firmly seat the cap C in cavity 74 of the anvil die head. It will be noted that in this position the cutting or blanking head 65 is spaced from the cap C. Thus, the cutting edge 65b is not dulled by any jamming action with the cap.

In order to control the transfer of the slug across this space to accurately position the same on the cap C so that the subsequent molding operation can be properly performed, the ejector 75 is forced downwardly by cam 76 to eject the slug (see FIG. 7). As it will be noted therein, the ejector 75 presses the slug 34 into adhesive bond with the cap C as a portion of the slug is still retained within the confines of the blanking die head 65. In this manner, the slug is adhered to the cap before the slug is completely free of the die head 65, thus eliminating any possibility of the slug from being laterally displaced as it is transferred to the cap. Consequently, positive predeterminate positioning thereof on the cap is assured.

As shown in FIG. 8, the ejector 75 continues downwardly as the die member 25 moves downwardly toward opening position whereby the slug 34 is thus rendered completely free of the blanking head 65.

Since the tip 75a of the ejector plunger 75 is formed of Teflon, a material having a wax-like smoothness, the tendency of the slug to adhere thereto is greatly resisted. Therefore, the adhesive bond between the slug and the cap C is rendered greater than the adhesive bond between the ejector 75 and slug. Consequently, when the dies 24 and 25 are returned to their normal open position as shown in FIG. 9, the proper positioning and adhesion of the slug to the cap is assured, the cap being held on the die 64 by the presser plate 66 during retraction or opening of the dies.

By thus insuring that the slug is properly located on the base member C lateral flow (radial flow in the illustrated embodiment of the invention) will be equal in all directions and the molding cavity will be completely filled so that the molded member a, FIG. 10, will have the proper shape and position on the base member C.

Thus, it will be noted that according to this invention the inherent difficulties of uncertainty in pick-up, transfer and positive positioning of the slug to a base member are overcome. By the means and methods herein described, the making of a composite article is greatly facilitated in that high speed equipment of the character described can be utilized. As a result, efficiency and economy of manufacture of said articles is greatly increased while the amount of waste or rejects is greatly reduced.

Variations and modifications may be made within the scope of the claims and portions of the improvements may be used without others.

I claim:

1. In a molding apparatus, means for blanking slugs of predetermined shape and volume from a strip of adhesive moldable material comprising a pair of cooperating blanking dies, one of said dies being hollow and having a peripheral cutting edge on the end thereof and said other die constituting an anvil; means for positioning a strip of moldable material between said hollow die and anvil; and means for relatively moving the said dies to and from separated and engaged positions to blank a slug from the strip, said anvil die having a plunger at least the end of which consists of a material to which the moldable material will not adhere, said plunger being normally slightly extended above the surface of said anvil and projecting slightly within the hollow die when said dies are engaged to prevent the formed slug from adhering to the surface of the anvil die when the anvil and hollow die separate whereby said hollow die retains the blanked slug upon completion of the blanking operation.

2. The invention as defined in claim 1 wherein said hollow die is provided with a transfer means including a retractable ejector mounted within said hollow die to force said slug therefrom, said ejector having a tip portion on the end thereof formed of a material to which the moldable material will not adhere to prevent adhesion of said slug thereto during the retraction of the ejector.

3. The invention as defined in claim 2 wherein said plunger in the anvil and tip of the ejector are formed of Teflon.

4. An apparatus for molding a member of predetermined shape and volume on a base member comprising a blanking die for blanking out from a strip of moldable adhesive material a slug of predetermined volume, said die being hollow and having an outwardly tapering cavity in the end thereof to facilitate retention of the slug therein; means for supporting a base member in predetermined position opposite the slug-carrying die and in spaced relationship thereto; and means for transferring the slug from the blanking die to the base member and adhering the slug thereto, said transferring means including an ejector mounted within the hollow die, said ejector having mounted on the end thereof a tip to which the moldable material will not adhere to prevent adhesion of the slug thereto while positively controlling the movement of the slug from said outwardly tapering cavity in the blanking die to a predetermined position on the base member.

5. In an apparatus for molding a member of predetermined shape and volume on a base member, means for blanking slugs of predetermined shape and volume from a strip of adhesible, moldable material including a pair of cooperating blanking dies, one of said dies being hollow and having a cutting peripheral edge on the end thereof, said other die constituting an anvil; means for positioning a strip of moldable material between said hollow die and anvil; means for relatively moving the said dies from separated to engaged positions to blank a slug therefrom, said anvil die having a plunger of non-adhesive material normally slightly raised above the surface of said anvil and projecting within the hollow die when said dies are engaged to prevent the major portion of the moldable material positioned between said dies from contacting the surface of the anvil die during the blanking operation so as to adhere thereto, said cutting die retaining the blanked slug therein upon separation of the hollow die and anvil; means for supporting a base member in predetermined position opposite the slug-retaining die and in spaced relationship thereto; and transferring means operatively associated with said slug-retaining die including means for preventing adhesion of the slug thereto while positively controlling the movement of the slug from said slug-retaining die to a predetermined position on the base member.

6. In an apparatus for molding a member of predetermined shape and volume on a base member; means for blanking slugs of predetermined shape and volume from a strip of adhesive, moldable material including a pair of cooperating blanking dies, one of said dies being hollow and having a peripheral cutting edge on the end thereof, said other die constituting an anvil; means for positioning a strip of said moldable material therebetween; means for relatively moving the said dies to and from separated and engaging positions to blank a slug therefrom, said anvil die having a plunger having at least the tip thereof formed of non-metallic material normally slightly raised above the surface of said anvil and projecting within the hollow die when said dies are engaged to prevent the major portion of moldable material positioned therebetween from contacting and adhering to the surface of the anvil die during the blanking operation; said cutting die retaining the blanked slug therein upon completion of the blanking operation; means for supporting a base member in predetermined position opposite said slug-retaining die and in spaced relationship thereto; transferring means operatively associated with said slug-retaining die including an ejector mounted therein, said ejector having on its end a non-metallic slug-engaging cap rendering said ejector non-adhesive to the slug; means actuating said ejector so that said slug is forced out of said retaining die slightly whereby said projected portion of the slug is adhesively positioned on said base member while a portion thereof remains retained by said die thus positively controlling the movement of the slug from the blanking die to predeterminate position on said base member; and means cooperating with said ejector to release said slug adhered to said base from said die.

References Cited in the file of this patent

UNITED STATES PATENTS

| | | |
|---|---|---|
| 1,232,297 | Hambuecken | July 31, 1917 |
| 2,033,725 | Pack | Mar. 10, 1936 |
| 2,403,476 | Berry et al. | July 9, 1946 |
| 2,479,959 | O'Niel | Aug. 23, 1949 |
| 2,552,027 | Bird et al. | May 8, 1951 |
| 2,657,426 | Gora | Nov. 3, 1953 |
| 2,688,776 | Evans et al. | Sept. 14, 1954 |
| 2,713,698 | Danby et al. | July 26, 1955 |